United States Patent Office 3,422,015
Patented Jan. 14, 1969

3,422,015
GREASE COMPOSITION
Peter Stanley Backlund, Anaheim, Calif., assignor to Union Oil Company of California, Los Angeles, Calif., a corporation of California
No Drawing. Filed Dec. 16, 1966, Ser. No. 602,138
U.S. Cl. 252—42.7      10 Claims
Int. Cl. C10m 5/00

ABSTRACT OF THE DISCLOSURE

A grease composition comprising a lubricating oil and a thickening agent consisting of the reaction product of a metal alkoxide and a copolymer of ethylene and an unsaturated ester.

---

Numerous polymerized materials, particularly hydrocarbons, have been previously employed as additives for lubricating oil compositions and greases. Examples are polymers of ethylene, propylene, butenes, pentenes, etc. These polymers are, however, commonly deficient in one or more characteristics that are desirable in a grease composition, such as high dropping or melting points, low oil-solubility, high resistance to oxidation, bleeding of oil, etc.

In accordance with this invention it has been discovered that many of these difficulties may be overcome by the use of a copolymer of ethylene and an unsaturated ester, which has been reacted with a metal alkoxide, particularly an alkoxide of aluminum or titanium, as a thickening agent.

Copolymers of ethylene and unsaturated esters are conventional and are described in numerous U.S. patents, e.g., Patent Nos. 2,703,794, 2,947,735, 3,093,623 and 3,156,675. They are available in a variety of molecular weights and viscosity grades under the trademarks of "Elvax" and "AC 400." The copolymers may contain from about 1 to 40 percent vinyl acetate with about 15 to 30 percent being the preferred range. Molecular weights of the copolymer may range from about 1000 to 3000, preferably about 1500 to 2000.

The unsaturated esters preferably contain from about 3 to 5 carbon atoms per molecule. Examples are vinyl acetate, vinyl propionate and methyl methacrylate.

The alkoxides of aluminum and titanium have the formulae:

$$Al(OR)_3 \text{ and } Ti(OR)_4$$

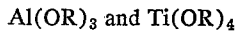

where R is an alkyl group containing about 1 to 10 carbon atoms. Examples are: aluminum methoxide, aluminum ethoxide, aluminum n-butoxide, aluminum ethylhexoxide (derived from 2-ethyl hexanol), aluminum decyloxide (derived from decyl alcohol), aluminum sec-butoxide diisopropoxide, tetra ethyl titanate, tetra n-butyl titanate, tetra 2-ethylhexyl titanate, etc. Other metals whose alkoxides may be used in the invention are zinc, calcium and magnesium.

The base oils that may be used for preparing the greases of the invention include a wide variety of lubricating oils, such as naphthenic base, paraffin base, and mixed base lubricating oils, other hydrocarbon lubricants, e.g., lubricating oils derived from coal products, and the synthetic oils, e.g., alkylene polymers (such as polymers of propylene, butylene, etc., and the mixtures thereof), alkylene oxide-type polymers (e.g., propylene oxide polymers) and derivatives thereof, including alkylene oxide polymers prepared by polymerizing the alkylene oxides in the presence of water or alcohols, e.g., ethyl alcohol, dicarboxylic acid esters (such as those which are prepared by esterifying such dicarboxylic acids as adipic acid, azelaic acid, sebacic acid, alkanol succinic acid, etc., with alcohols such as butyl alcohol, hexyl alcohol, 2-ethyl hexyl alcohol, etc.), liquid esters of acids of phosphorus, alkyl benzenes (e.g., monoalkyl benzenes such as dodecyl benzene, tetradecyl benzene, etc.), etc. These base oils may be used individually or in combinations wherever miscible or wherever made so by use of mutual solvents.

It has also been found that the grease compositions of the invention are most conveniently prepared by first incorporating the ethylene-unsaturated ester copolymer in the base oil. The mixture is then thoroughly mixed to disperse the copolymer in the base oil. Conventional procedures such as stirring or milling may be used for this purpose. Heating of the polymer, oil or the mixture before or during mixing is also preferably employed to aid in dispersion of the copolymer in the base oil. Temperatures corresponding to the desired reaction temperature for the copolymer-metal alkoxide reaction, i.e., about 325 to 375° F., may be employed for this purpose.

Following dispersion of the copolymer in the base oil, the metal alkoxide is added and mixed with the other ingredients by similar conventional mixing procedures. The mixture of base oil, copolymer and metal alkoxide is maintained at a temperature of about 325 to 375° F., preferably about 345 to 355° F., for a period of time sufficient to effect the desired reaction between the copolymer and the metal alkoxide. A reaction time of about 4 to 10 minutes, preferably about 4 to 5 minutes, is generally suitable. Optimum values of both time and temperature of the reaction will, however, depend on a variety of factors, such as the nature of the base oil, type of copolymer and metal alkoxide, properties of grease desired, etc., and are best determined experimentally. The properties of the desired grease will, of course, depend on the intended use of the grease composition. Such uses include high temperature greases, encapsulating compositions, rust preventives, etc.

After completion of the reaction the mixture is worked to a grease consistency by any conventional procedure such as cooling in a kneading type mixer or pump.

Alternative procedures may also be used in preparing the grease composition of the invention, e.g., the metal alkoxide may be mixed with the base oil prior to addition of the copolymer. Or the reaction between the metal alkoxide and the copolymer may be carried out prior to addition to the base oil. This will, however, generally require the use of an inert solvent such as kerosene as the reaction medium and is usually less convenient since separation of the reaction product and the solvent may be required.

Relative proportions of the copolymer and the metal alkoxide will vary from about 8/1 to 80/1, with about 10/1 to 60/1 being the preferred range. The amount of thickener, i.e., copolymer-metal alkoxide reaction product will range from about 2 to 20 weight percent of the total composition with about 7.5 to 15.0 weight percent being the preferred range. Again, optimum proportions will depend on the above variables and are best determined experimentally.

The exact nature of the reaction between the metal alkoxide and the ethylene-unsaturated ester copolymer is not known but the reaction is believed to involve a transesterification and cross-linking which results in a gelled mixture that can be readily worked to a grease consistency.

Other conventional additives may also be desirable in the grease compositions of the invention for certain uses. These additives include oxidation or corrosion inhibitors, dispersing agents, dyes, etc.

The invention is more specifically illustrated by the following examples.

EXAMPLE I 15 grams of Elvax 220 (vinyl acetate-ethylene copolymer containing 28% vinyl acetate) was mixed with 85 grams of 90 Neutral Oil at a temperature of 350° F. As soon as the Elvax was completely mixed 0.25 gram of aluminum isopropoxide was added and stirred for five minutes at this temperature. The resulting gelled mixture was poured onto a cold plate and "worked" to grease consistency with a spatula. The grease so formed does not bleed oil on standing.

EXAMPLES II TO V

The procedure of Example I was repeated using the following types and amounts of ingredients:

| Ex. | Base oil | Copolymer | Metal alkoxide |
|---|---|---|---|
| II | 92.5 grams, 90 neutral. | 7.5 grams Elvax 220. | 0.45 grams aluminum isopropoxide. |
| III | 90.0 grams, 90 neutral. | 10.0 grams Elvax 220. | 0.2 grams aluminum isopropoxide. |
| IV | 92.5 grams, 90 neutral. | 7.5 grams Elvax 220. | 0.69 grams aluminum tridecylate. |
| V | do | do | 0.41 grams tetra 2-ethylhexyl titanate. |

All of the above examples produced gelled mixtures that were readily worked to a grease consistency and did not bleed oil on standing.

I claim:
1. A grease composition comprising a major proportion of an oil of lubricating viscosity and an amount of a reaction product of (1) an ethylene-unsaturated ester copolymer and (2) an alkoxide of a metal selected from the group consisting of aluminum, titanium, zinc, calcium, and magnesium in an amount sufficient to thicken the oil to a grease consistency.
2. The composition of claim 1 in which the oil is a mineral lubricating oil.
3. The composition of claim 1 in which the ethylene-unsaturated ester copolymer is a copolymer of ethylene and vinyl acetate.
4. The composition of claim 3 in which the copolymer contains about 28 percent vinyl acetate.
5. The composition of claim 1 in which the metal alkoxide is an aluminum alkoxide.
6. The composition of claim 5 in which the alkoxide is aluminum isopropoxide.
7. The composition of claim 5 in which the alkoxide is aluminum tridecylate.
8. The composition of claim 1 in which the metal alkoxide is a titanium alkoxide.
9. The composition of claim 8 in which the alkoxide is tetra 2-ethylhexyl titanate.
10. The composition of claim 1 in which the amount of the copolymer-metal alkoxide reaction product is about 2 to 20 percent by weight of the composition.

References Cited

UNITED STATES PATENTS

| | | | |
|---|---|---|---|
| 2,698,297 | 12/1954 | Giammaria | 252—35 |
| 2,698,298 | 12/1954 | Giammaria | 252—35 |
| 2,698,299 | 12/1954 | Giammaria | 252—35 |
| 2,703,794 | 3/1955 | Roedel | 260—87.3 |
| 2,947,735 | 8/1960 | Bartl | 260—87.3 |
| 3,093,623 | 6/1963 | Ilnyckyj | 260—87.3 |
| 3,156,675 | 11/1964 | Ehmann | 260—87.3 |

DANIEL E. WYMAN, *Primary Examiner.*

I. VAUGHN, *Assistant Examiner.*